Oct. 25, 1955    H. S. PASTURCZAK    2,721,390
SUPPORTING DEVICE FOR DIAL INDICATORS
Filed March 3, 1951    2 Sheets-Sheet 1
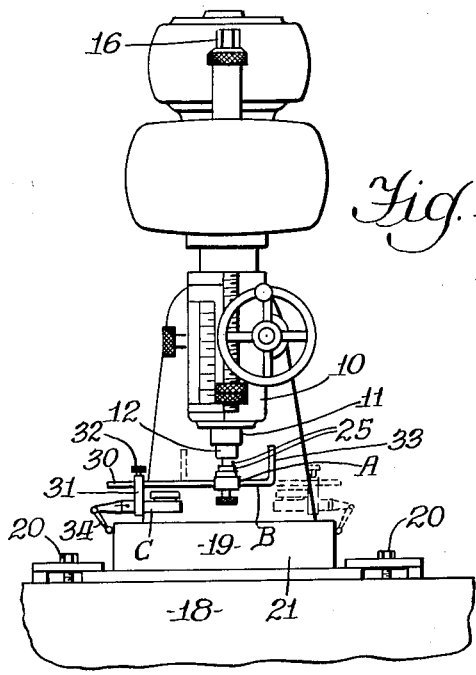
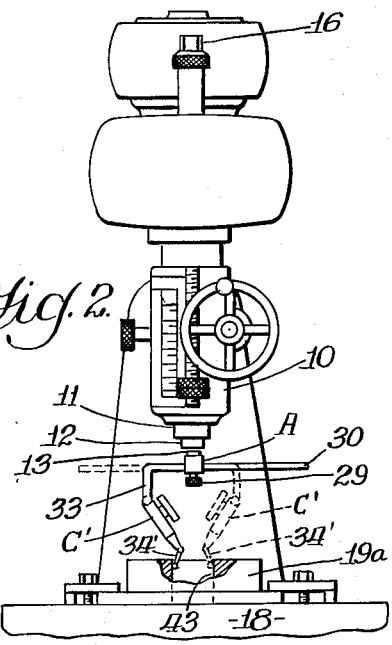
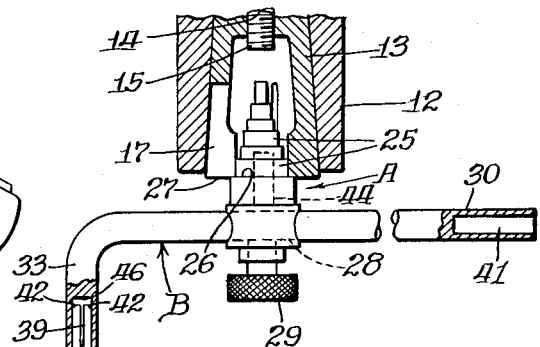
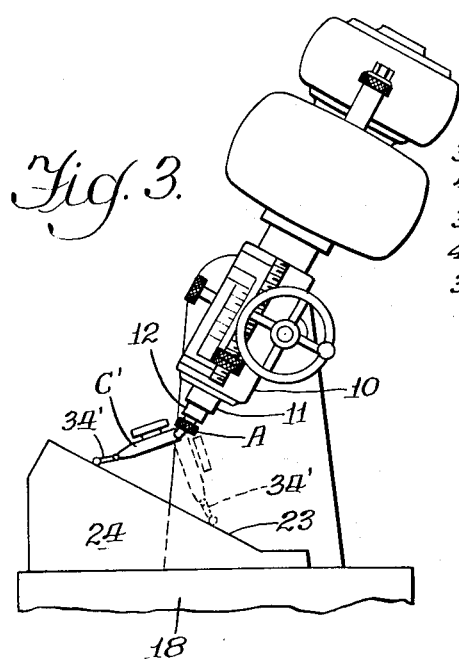
Inventor.
Harry S. Pasturczak Oct. 25, 1955        H. S. PASTURCZAK        2,721,390
SUPPORTING DEVICE FOR DIAL INDICATORS
Filed March 3, 1951                2 Sheets-Sheet 2
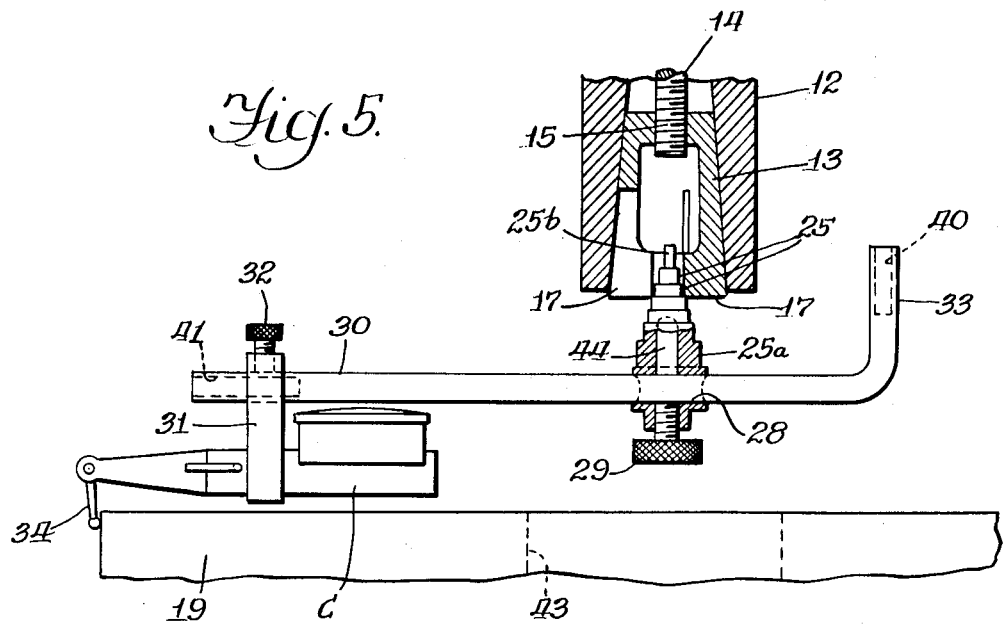
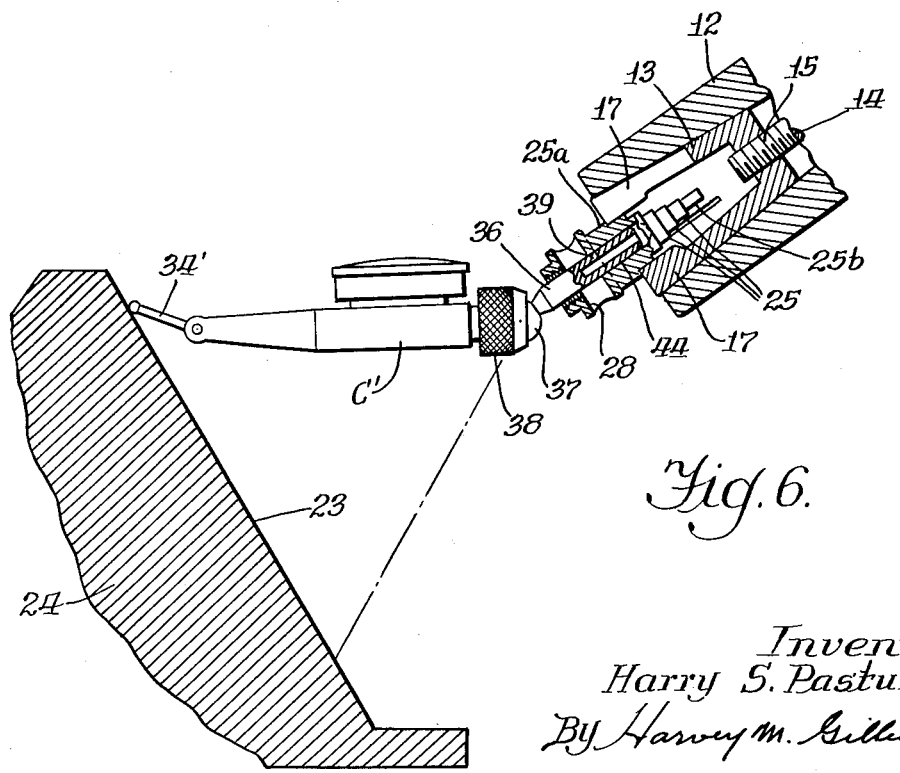
Inventor.
Harry S. Pasturczak
By Harvey M. Gillespie
Atty.

United States Patent Office 2,721,390
Patented Oct. 25, 1955

2,721,390

SUPPORTING DEVICE FOR DIAL INDICATORS

Harry S. Pasturczak, East Moline, Ill.

Application March 3, 1951, Serial No. 213,755

6 Claims. (Cl. 33—172)

This invention relates to devices for supporting the dial indicators which are ordinarily used by machinists and other artisans to properly locate a work piece or pieces, as the case may be, in a machine preliminary to performing machine operations on such work piece.

Dial indicators are used in various situations and in connection with various kinds of machine operations, for example they may be employed to center or otherwise locate a work piece in a machine, check the alignment of one piece in relation to another, or check the position of one or more adjustable parts of a machine in relation to each other or in relation to a work piece secured in the machine. While one of the important uses of a dial indicator is during the setting up of work pieces in a machine, they are also used to check the progress of the work. It is frequently desirable, therefore, during the performance of work of various types of machines, for example, planers, boring machines, milling machines and the like, to check the progress of the work by removing the cutting tool of the machine and substituting a dial indicator therefor. These substitutions and checking operations, heretofore, have involved long delays, since the indicator stem may not fit the tool holding collet. This will be particularly true if the machine work being performed requires the use of several tools of various sizes. In such case the tool holding collet must be removed from time to time and another collet, of suitable size for holding the indicator, inserted in the machine to facilitate the recurrent use of the indicator device.

A principal object of the invention is to provide a supporting device for dial indicators of the above character which is so constructed that a single supporting device may be used in connection with various types of dial indicators and collets and chucks of various sizes, whereby the dial indicator may be readily and conveniently interchanged with the cutting tool regardless of the size of the tool supporting collet.

Another object is to provide a simplified supporting device of the above character which will permit parts thereof to be assembled in different selective arrangements, whereby a dial indicator body may be attached to a cross arm of the supporting device or directly to the central stem thereof, as may be desired.

The improved dial indicator support of the present invention may be described briefly as comprising a stem element having a series of steps which provide a series of diameters throughout the length of the stem, the said diameters progressively decreasing from a maximum diameter at the outer end of the stem to a minimum diameter at the inner end of the stem. The series of steps of progressively differing diameters are preferably, but not necessarily, circular and permits the stem element of the supporting structure to be fitted into collets of different sizes, the size of the collet or chuck being selected according to the size of the tool used to perform the machine operation on the work piece and without regard to the size of the stem of the indicator supporting device. The stem element of the invention is formed with a transverse bore to receive a transverse supporting arm which may be adjusted to various positions. Both ends of the arm are provided with axial bores to receive an adapter pin secured to the body of the indicator device. The stem element per se is also provided with an axial bore which is adapted to receive the adapter pin and thereby provide for direct connection of the dial indicator to the multiple diameter stem of the support.

When a transverse support arm is utilized, it is locked in the stem element by means of a set screw. The dial indicator may be attached to either end of the supporting arm, as indicated in the several figures of the drawing.

When a dial indicator is attached directly to the spindle having the multiple diameters, the said adapter stem is inserted in an axial bore formed in the spindle. The end of the adapter stem which extends into the axial bore of the spindle is preferably bifurcated to provide resilient prongs which frictionally grip the wall of the axial bore with sufficient pressure to maintain the dial indicator, attached to the end thereof, in proper position relative to a work piece, but with capacity for turning movement about the axis of the adapter stem. The other end of the adapter stem is formed with a ball element of a ball and socket clamp for attaching the adapter stem to the dial indicator.

It is a specific object of the invention to provide an indicator supporting device constructed to function in the manner above described.

The invention is illustrated in certain preferred constructions in the accompanying drawings wherein:

Figs. 1, 2 and 3 illustrate certain variations in the assembly of the several parts of the improved supporting device and also illustrate the manner in which the multiple diameter stem element of the supporting device is attached to the spindle of a milling machine so as to perform certain desired work checking operations;

Fig. 4 is a fragmentary view, partly in section, and illustrating on a somewhat larger scale, the dial indicator and supporting device shown in Fig. 2.

Fig. 5 is an enlarged fragmentary view, showing the dial indicator and supporting device in the position illustrated in Fig. 1; and Fig. 6 is an enlarged fragmentary view illustrating the embodiment shown generally in Fig. 3.

Referring first to Figs. 1, 2 and 3 of the drawings: The several embodiments of the invention are illustrated in connection with one type of vertical milling machine. This type of machine is shown in the drawings merely to illustrate some routine uses of the invention and should not be regarded as a limitation on the scope of its use. The intent and purpose of the invention is to provide an indicator support which may be attached to a tool supporting element, tail stock or other part of a machine so that an indicating device can be supported to check the position or location of a work piece in the machine or to indicate the position of one machine element with relation to another—for example the position of a movable head of a milling machine relative to the work supporting table of the machine or in relation to a surface or center of a work piece supported on said table.

The milling machine shown herein fragmentarily includes a machine head 10, a ram 11 movably supported in the head and a spindle 12 mounted for rotation within the ram 11. A tool supporting collet 13 fits into a tapered axial bore in the lower end of the spindle. The collet 13 is of the split cone type formed to fit the conical bore of the spindle and is held in frictional engagement therewith by means of a pull rod 14. The lower end of the pull rod has threaded engagement with the collet as indicated at 15, whereupon the turning of the hexagonal head 16 of the rod draws the collet into conical bore of the spindle and thereby causes the jaws 17 of the collet to tightly clamp the cutting tool of the machine.

If the work to be performed by the machine requires the head 10 and spindle 12 to be perpendicular to the machine table 18, an indicator C, for example a dial indicator is fixed to the spindle 12 by means of the indicator support of the present invention and the indicator is positioned to bear on the top surface of the table. By manual turning of the spindle the indicator is caused to wipe the top of the table with a circular movement to indicate the angularity of the head 10 relative to the table 18. When the necessary adjustments are made to bring the head 10 and table 18 into perpendicular relation to each other, the indicator will have a zero reading at all positions of its circular sweeping movement.

The work piece 19 shown in Fig. 1 may be regarded as either circular or rectangular. If it is circular, it may be centered on the table 18 in relation to the principal axis of the spindle by positioning the indicator C so that its sensing finger will engage the outer perimeter of the work piece. The manual turning of the spindle 12 to cause the indicator to sweep around the work piece 19 produces an indicator reading which will indicate the eccentricity of the work piece relative to the axis of the spindle 12, whereupon the work piece may be shifted in the proper direction to give a zero reading on the indicator. When such zero reading is obtained the work piece is properly centered and can be clamped to the table 18 by tightening the clamp bolts 20—20.

If the said work piece is rectangular and it is desired to align its center with the center of the spindle the indicator is positioned to engage a side face 21 of the work piece and the table of the machine is moved lengthwise. The position of the work piece 19 may be shifted during the movement of the table 18 until a zero reading is obtained on the indicator C, at which time the clamp bolts 20 may be tightened to hold the work piece on the table.

Fig. 2 shows the customary manner in which the indicator and its supporting arm are positioned to center or otherwise locate a hole or a slot 22 in the work piece 19 centered relative to the axis of the spindle 12.

Fig. 3 illustrates a conventional use of an indicator to facilitate the adjustment of the head 10 of the machine to a position perpendicular to an inclined face 23 of a work piece 24.

The improved supporting device of the present invention includes a stem A, and means designated as a whole by reference letter B for attaching the work positioning indicator C to the stem A. The stem is of the same construction in the several figures of the drawing and comprises a body provided with a series of cylindrical surfaces 25—25, which increase in diameter progressively from the inner end of the stem to the outer end thereof, to provide shoulders 26—26 which are defined by the changing diameters of the cylindrical surfaces 25—25. According to the size of the split collet 13 held in the spindle 12 or other operating part of a machine, one of the plurality of the cylindrical surfaces 25—25 is adapted to fit more or less snugly in the jaws 17 of the collet, one of the shoulders 26—26 being thus adapted to bear against the protruding face 27 of the collet.

The outer end portion of the stem A is drilled transversely of the principal axis thereof to provide a bore 28 for receiving the support arm B for the dial indicator C. The support arm B is held firmly in the bore 28 of the stem by a knurled thumb screw 29. When a dial indicator of the type shown in Figs. 1 and 5 is used, it is clamped to an end portion 30 of the support arm B by means of an adjustable mounting bracket 31. The mounting bracket 31 is securely held in adjusted position on the leg 30 of the support arm B by means of a knurled thumb screw 32. The indicator C can be mounted on the vertical end portion 33 of the support arm B by means of the mounting bracket 31 when it is desired to support the indicator in a vertical position or the end 33 may be clamped in the said stem. The indicator C is provided with a sensing finger 34 which, through a bell-crank and other mechanism, not shown, transmits movement of the sensing finger to an indicator needle which is deflected from a normal position to show the position of the work piece in relation to the center of the collet 13.

In Fig. 1, the sensing finger 34 is shown in contact with the outer surface of the work piece 19. Consequently the amount of eccentricity of the work piece relative to the axis of the spindle can be determined by manual rotation of the spindle.

The stem A and support arm B, as previously indicated, may be the same in all figures of the drawings, but the orifice defined by the jaws 17 of the collet 13 is such that the collets shown in Figs. 2, 3, 4 and 6 are intended to grip larger tools than the collet 13 of Figs. 1 and 5. Therefore the jaws 17 of collet 13 in Figs. 4 and 6 are shown as gripping a larger cylindrical surface 25 of the stem A than is gripped in Figs. 1 and 5. The dial indicator, designated C' in Figs. 2 and 4, is attached to the vertical end portion 33 of the support arm B, by means of an adapter pin 36. One end of the adapter pin 36 is formed with a ball 37 which forms one part of a ball and socket clamp 38 for attaching the adapter pin 36 to the indicator C'. The other end of the adapter pin is bifurcated to form resilient prongs 39 which are inserted into an axial bore 40 in the leg 33 of the support arm B. The resilient prongs 39 of the adapter pin fit snugly into the bore 40 so as to frictionally hold the indicator C' in any desired position of adjustment. As an alternative, the indicator C' may be attached to the horizontal leg 30 of the support arm B by inserting the adapter pin 36 in the axial bore 41 formed in the said horizontal leg of the support arm B. Preferably the ends of the prongs 39 are beveled as shown at 42 to facilitate easy entrance of the prongs into the bore 40 or 41. Thus the work centering indicator C' can be quickly applied to and removed from either end of the support arm B. Furthermore, the ball and socket connection makes it practicable to so arrange the sensing finger 34' of the indicator C' as to check the eccentricity of a bore 43 in a work piece 19a.

Referring now to the Figs. 3 and 6 of the drawing: All of the elements depicted in Fig. 4 are the same as the corresponding elements shown in Figs. 2 and 3 except in respect to the attachment of the indicator C' to the cross arm B of the support device. However, with the assembly of parts as shown in Figs. 3 and 6 the dial indicator C' of Fig. 4 is connected directly to the multiple diameter stem A. This form of assembly is effected by removing the support arm B and its clamp screw 29, whereupon the bifurcated end of the adapter pin 36 may be inserted in an axial bore 44 formed in the central stem element A.

It will be observed that the cylindrical surface designated 25a is somewhat wider than the next adjacent surface 25. This greater width is provided to facilitate the use of the multiple diameter stem with collets of the nose closing type as distinguished from the "draw in" type collet shown herein. It will also be observed that the portion of the stem designated 25b provides a jaw clamping surface which is somewhat longer than the adjacent surface 25 and thereby better adapted to the use of the said stem in connection with small drill chucks.

In the use of the device according to the present invention, irrespective of which of the assemblies is employed, the stem element A is adapted to be supported in the split collet 13 or other form of tool holding chuck regardless of the size thereof, since the proper cylindrical surface 25 of the stem will be engaged by the split jaws 17 of the collet or chuck, and since the proper shoulder 26 of the stem will bear against the face of the collet or chuck. It will be apparent that when the spindle A and the support arm B are rotated orbitally with respect to the work piece, such rotation will be with a minimum of variation. Once the work piece 19 has been adjusted so that it is properly located relative to the spindle 12 or other part of the machine, the cutting tool of the machine and the stem of the indicator support may be repeatedly interchanged without necessity of changing the collet, since the multiple diameter stem A will fit all collets within a predetermined range of sizes.

I claim:

1. In combination with an indicator device for determining the position of a machine element with respect to another object, means for supporting said indicator device comprising a stem formed at one end with longitudinal and transverse openings therein and also formed with a series of circular steps of different diameters which progressively increase in diameter from one end of the stem to the other and provide a plurality of individual surfaces for selective attachment to said machine element, and means for adjustably attaching said indicator device to said stem in a position to engage said object including an arm movably fitted in one of said openings and means for adjustably clamping the indicator device to said arm.

2. In combination with an indicator device for determining the position of a work piece in a machine, means for supporting said indicator device comprising a stem formed with a bore therein and with a series of cylindrical steps which progressively increase in diameter from a minimum diameter at one end to a maximum diameter adjacent the other end thereof and provide a plurality of individual surfaces for selective attachment to the machine with capacity for rotation about a predetermined axis, and means insertable in said bore for removably attaching said indicator device to said stem in a position to engage a surface of said work piece, whereby rotational movement of said indicator device about the rotational axis of said stem measures the location of the work piece relative to the axis of said stem.

3. In combination with an indicator device for indicating the location of a work piece in relation to an element of a machine on which the work piece is supported, supporting means for said indicator comprising a stem formed with a plurality of cylindrical surfaces of diameters which vary in steps from a small diameter at one end thereof to a large diameter adjacent the other end thereof, said cylindrical surfaces being adapted to fit selectively to the inside diameters of tool holding devices of various sizes, a transverse arm of angular configuration providing a horizontal portion and a vertical portion adapted to be selectively secured to said stem and adjustable with respect thereto, and means comprising a mounting bracket carried on said arm for removably attaching said indicator device to said supporting arm in a position to engage a surface of said work piece to check its location or parts thereof relative to the principal axis of said stem.

4. The invention as defined in claim 2 wherein the said bore in the stem extends axially thereof and the indicator device attaching means comprises an adapter pin fitted into said axial bore of the stem.

5. The invention as defined in claim 4 wherein one end of said adapter pin is bifurcated to provide resilient prongs for frictionally gripping the wall of said axial bore.

6. The invention as defined in claim 5 wherein the other end of the adapter pin is formed with a ball element of a ball and socket connection between the adapter pin and the indicator device.

References Cited in the file of this patent

UNITED STATES PATENTS

| | | |
|---|---|---|
| 69,954 | Richards | Oct. 15, 1867 |
| 328,699 | Matern | Oct. 20, 1885 |
| 598,055 | McCabe | Jan. 25, 1898 |
| 1,086,528 | Hanson et al. | Feb. 10, 1914 |
| 1,391,731 | Genung | Sept. 27, 1921 |
| 1,425,193 | Gates | Aug. 8, 1922 |
| 1,994,497 | Winters | Mar. 19, 1935 |
| 2,098,838 | Rusnak | Nov. 9, 1937 |
| 2,304,460 | Kelleher | Dec. 8, 1942 |
| 2,323,039 | Hill | June 29, 1943 |
| 2,456,383 | Collins | Dec. 14, 1948 |
| 2,486,503 | Stephens | Nov. 1, 1949 |
| 2,586,639 | Freimark | Feb. 19, 1952 |
| 2,601,965 | Scalise | July 1, 1952 |

FOREIGN PATENTS

| | | |
|---|---|---|
| 136,689 | Great Britain | Dec. 24, 1919 |
| 595,342 | Great Britain | Dec. 2, 1947 |